(12) United States Patent
Suzuki et al.

(10) Patent No.: US 11,354,254 B2
(45) Date of Patent: Jun. 7, 2022

(54) DATA PROCESSING SYSTEM, CENTRAL ARITHMETIC PROCESSING APPARATUS, AND DATA PROCESSING METHOD

(71) Applicant: NIPPON TELEGRAPH AND TELEPHONE CORPORATION, Tokyo (JP)

(72) Inventors: Takahiro Suzuki, Tokyo (JP); Sang-Yuep Kim, Tokyo (JP); Jun-ichi Kani, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/271,190

(22) PCT Filed: Oct. 17, 2019

(86) PCT No.: PCT/JP2019/040834
§ 371 (c)(1),
(2) Date: Feb. 24, 2021

(87) PCT Pub. No.: WO2020/080458
PCT Pub. Date: Apr. 23, 2020

(65) Prior Publication Data
US 2021/0334223 A1     Oct. 28, 2021

(30) Foreign Application Priority Data

Oct. 19, 2018   (JP) .............................. JP2018-197945

(51) Int. Cl.
*G06F 13/12* (2006.01)
*G06F 9/30* (2018.01)
*G06F 9/38* (2018.01)

(52) U.S. Cl.
CPC ............ *G06F 13/12* (2013.01); *G06F 9/3001* (2013.01); *G06F 9/3877* (2013.01)

(58) Field of Classification Search
CPC ...... G06F 13/12; G06F 9/3877; G06F 9/3001; G06F 15/167
See application file for complete search history.

(56) References Cited

U.S. PATENT DOCUMENTS

2007/0273699 A1   11/2007  Sasaki et al.
2008/0114937 A1*   5/2008  Reid ..................... G06F 11/362
                                                                        711/117
(Continued)

OTHER PUBLICATIONS

Takahiro Suzuki et al., "Real-time Demonstration of PHY Processing on CPU for Programmable Optical Access Systems", 2016 IEEE Global Communications Conference (GLOBECOM2016), 2016.
(Continued)

*Primary Examiner* — Farley Abad
(74) *Attorney, Agent, or Firm* — Harness, Dickey & Pierce, P.L.C.

(57) ABSTRACT

An optical line terminal (OLT) (1) includes an interface (I/F) board (2) configured to communicate with an external apparatus, a graphics processing unit (GPU) (4) configured to perform a first process, and a central processing unit (CPU) (3) configured to control the I/F board (2) and the GPU (4). The CPU (3) includes a data processing execution unit configured to execute a second process, an external transfer control unit configured to perform a control process of transferring data received from the external apparatus from the I/F board (2) to the CPU (3) or the GPU (4) and a control process for transferring data to be transmitted to the external apparatus from the CPU (3) or the GPU (4) to the I/F board (2), a data processing control unit configured to perform control for executing the first process of the GPU (4) and the second process of the CPU (3) on the data (Continued)

received from the external apparatus or the data to be transmitted to the external apparatus; and a processing result copy unit configured to perform control for outputting a processing result of the first process to the CPU (3) and designating the processing result of the first process as a processing target of the second process and control for outputting a processing result of the second process to the GPU (4) and designating the processing result of the second process as a processing target of the first process.

5 Claims, 5 Drawing Sheets

(56) References Cited

U.S. PATENT DOCUMENTS

| | | | |
|---|---|---|---|
| 2011/0157195 A1 | 6/2011 | Sprangle et al. | |
| 2012/0079498 A1* | 3/2012 | Kim | G06F 9/5066 718/104 |
| 2012/0149418 A1* | 6/2012 | Skubic | H04L 47/2425 455/509 |
| 2013/0226535 A1* | 8/2013 | Tuan | G06F 30/367 703/2 |
| 2015/0356768 A1* | 12/2015 | Taylor | G06T 15/005 345/428 |
| 2018/0143909 A1* | 5/2018 | Lee | G06F 3/0646 |

OTHER PUBLICATIONS

Takahiro Suzuki et al., "Demonstration of 10-Gbps Real-Time Reed-Solomon Decoding Using GPU Direct Transfer and Kernel Scheduling for Flexible Access Systems", Journal of Lightwave Technology, May 2018, vol. 36, No. 10, p. 1875-1881.

Kenta Sato et al., Realization of MPI Environment by Verbs Implementation in Tightly Coupled Accelerators TCA, IPSJ Technical Report, High Performance Computin (HPC) 2015-HPC-150, 2015, pp. 1-9, retrieval date Dec. 10, 2019.

Tetsuya Odajima et al., Extend to GPU for XcalableMP: A Parallel Programming Language, IPSJ SIG Technical Reports, vol. 2011-HPC-129 No.12, Mar. 15, 2011.

Jun-ichi Kani et al., Flexible Access System Architecture (FASA) to Support Diverse Requirements and Agile Service Creation, Journal of Lightwave Technology, vol. 36, No. 8, Apr. 15, 2018.

IEEE Std 802.3av™-2009.

Xiang-wen Wang et al., Paralleling Variable Block Size Motion Estimation of HEVC on Multicore CPU Plus GPU Platform, ICIP 2013.

International Search Report issued in PCT/JP2019/040834, dated Dec. 17, 2019.

\* cited by examiner

DATA PROCESSING SYSTEM, CENTRAL ARITHMETIC PROCESSING APPARATUS, AND DATA PROCESSING METHOD

CROSS-REFERENCE TO RELATED APPLICATIONS

This application is a 371 U.S. National Phase of International Application No. PCT/JP2019/040834 filed on Oct. 17, 2019, which claims priority to Japanese Application No. 2018-197945 filed on Oct. 19, 2018. The entire disclosures of the above applications are incorporated herein by reference.

TECHNICAL FIELD

The present invention relates to a data processing system, a central arithmetic processing apparatus, and a data processing method.

BACKGROUND ART

In recent years, virtualization has been attracting attention in the field of networks. According to the virtualization, apparatuses constituting a network can be logically used regardless of an actual physical hardware configuration. For the virtualization, a configuration in which an apparatus such as an optical line terminal (OLT), which has been conventionally made of dedicated hardware in an optical access system, includes general-purpose hardware and its functions are implemented with software is being studied. By implementing the functions with software, the functions of the apparatuses can be replaced. Additionally, apparatuses can be shared and resources can be shared. Thus, reduction in capital expenditure (CAPEX) can be expected. Also, it is thought that software can reduce CAPEX by facilitating function updates and setting changes.

Here, the implementation technology of a graphics processing unit (GPU) provided in an access system is shown as a study for expanding the software area of the access system to physical layer processing including an error correction function. Because the physical layer processing requires a large number of operations, it is conventionally mounted in an application specific integrated circuit (ASIC) which is a dedicated chip. In general, it is difficult for general-purpose hardware to perform a process at a high speed. Thus, when only a central processing unit (CPU) is used for the physical layer processing, it is difficult to achieve throughput performance. Also, as for the trend of general-purpose processors, the performance of CPUs has reached a plateau. Therefore, performance has been improved by combination with accelerators such as a GPU or a field-programmable gate array (FPGA) which have many cores and in which parallelization is possible at a high level. In this manner, the required performance is achieved using an accelerator such as a GPU.

Figure 4:
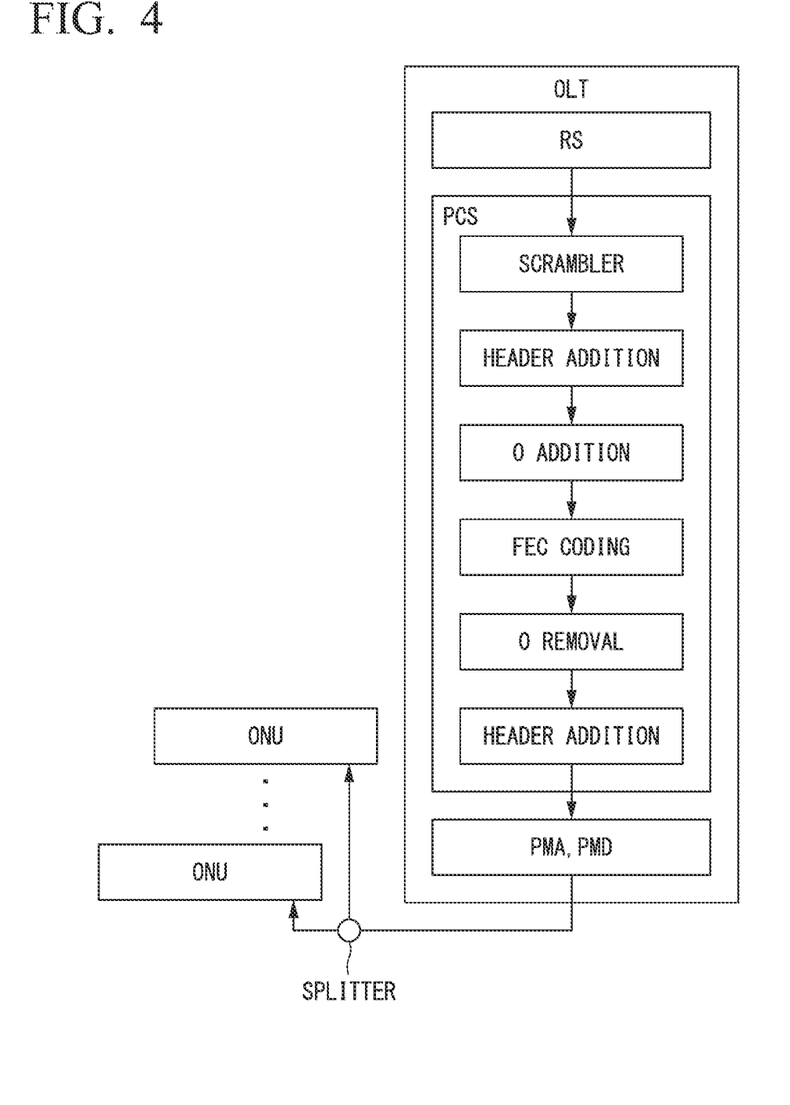
FIG. 4 is a diagram showing a function related to a coding process in the OLT of conventional technology.

An optical line terminal (OLT), which is a station-side apparatus in a 10 Gigabit Ethernet (registered trademark) passive optical network (10G-EPON) (see, for example, Non-Patent Literature 2) system, implements a coding process according to a function shown in FIG. 4. That is, a physical layer includes a physical medium attachment (PMA) sublayer, a physical medium dependent (PMD) sublayer, a physical coding sublayer (PCS), and a reconciliation sublayer (RS). The function of performing the coding process corresponds to the PCS. Functions within the PCS include scrambling, header addition, 0 addition/removal, forward error correction (FEC) coding, and the like.

Here, technology for implementing the PCS function with software is taken into account. Regarding the coding process in the PCS, an available parallel processing function and an unavailable parallel processing function are mixed. The GPU can significantly increase the speed for the available parallel processing function. However, processing of the CPU effective for sequential processing can be faster than processing of the GPU with respect to the unavailable parallel processing function. Thus, an architecture that enables a cooperative process between the CPU and GPU is required. Further, when the CPU and the GPU are used for a communication process, technology for continuously transferring signals to the CPU and the GPU is required.

From the above-described two points, an architecture in which the cooperative process is possible in the CPU and the GPU, an architecture in which signals can continuously flow, and a method of controlling such an architecture are required. In addition, there is a need for a method of continuously transferring signals to outside and passing through a CPU and a GPU.

A cooperative processing system using a CPU and a GPU has been proposed for speeding up image processing and the like. In this cooperative processing system, a configuration is adopted in which the transfer of a memory from the CPU to the GPU and processing on the data transferred to the GPU are iterated.

Figure 5:
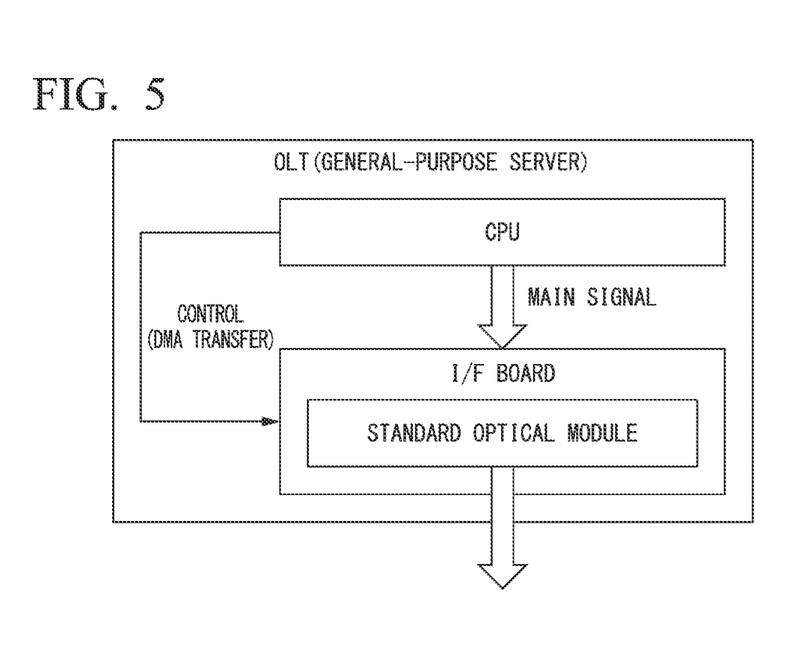
FIG. 5 is a diagram showing signal transfer in the OLT of the conventional technology.

FIG. 5 shows a method of directly transferring a signal calculated by a CPU to outside within an OLT (see, for example, Non-Patent Literature 1). The OLT shown in FIG. 5 is implemented using, for example, a general-purpose server. In the method shown in FIG. 5, a plurality of transmission buffers are secured in the CPU. The CPU transfers a main signal while sequentially changing an address of the buffer where a main signal transmitted to an interface (I/F) board is stored every time the transfer is performed. Only the CPU performs operations on the main signal.

Figure 6:
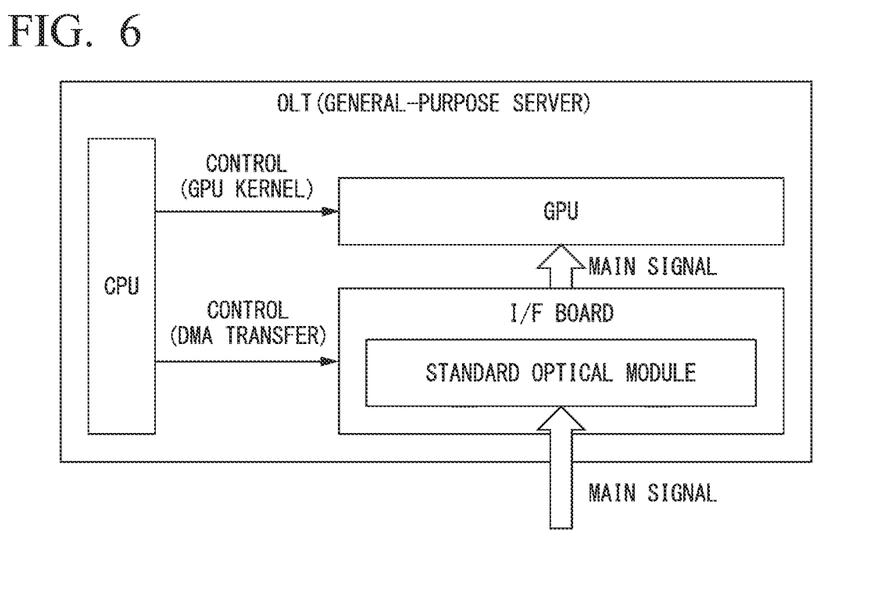
FIG. 6 is a diagram showing signal transfer in the OLT of the conventional technology.

FIG. 6 shows a method of continuously and directly transferring external signals to the GPU in an OLT (see, for example, Non-Patent Literature 2). The OLT shown in FIG. 6 is implemented using, for example, a general-purpose server. In the method shown in FIG. 6, a plurality of reception buffers are secured in the GPU. The OLT sequentially changes an address of the buffer where a signal received by the GPU is stored every time the transfer is performed and performs the transfer. Only the GPU performs the operations on the main signal.

CITATION LIST

Non-Patent Literature

[Non-Patent Literature 1]
Takahiro Suzuki, Sang-Yuep Kim, Jun-ichi Kani, Ken-Ichi Suzuki, Akihiro Otaka, "Real-time Demonstration of PHY Processing on CPU for Programmable Optical Access Systems," 2016 IEEE Global Communications Conference (GLOBECOM 2016), 2016

[Non-Patent Literature 2]
Takahiro Suzuki, Sang-Yuep Kim, Jun-ichi Kani, Toshihiro Hanawa, Ken-Ichi Suzuki, Akihiro Otaka, "Demonstration of 10-Gbps Real-Time Reed-Solomon Decoding Using GPU Direct Transfer and Kernel Scheduling for Flexible Access Systems," Journal of Lightwave Technology, May 2018, Vol. 36, No. 10, pp. 1875-1881

SUMMARY OF INVENTION

Technical Problem

However, only the CPU performs the operations on the main signal in the technology shown in FIG. 5 described above and only the GPU performs the operations on the main signal in the technology shown in FIG. 6. In this manner, a central arithmetic processing apparatus (CPU) and an accelerator do not cooperatively perform the operations on the main signal in the above-described technologies.

In view of the above circumstances, an objective of the present invention is to provide a data processing system, a central arithmetic processing apparatus, and a data processing method capable of enabling a central arithmetic processing apparatus and an accelerator to cooperatively perform data processing.

Solution to Problem

According to an aspect of the present invention, a data processing system is provided including: an interface circuit configured to communicate with an external apparatus; an accelerator configured to perform first data processing; and a central arithmetic processing apparatus configured to control the accelerator and the interface circuit, wherein the central arithmetic processing apparatus includes a data processing execution unit configured to perform second data processing; an external transfer control unit configured to perform at least one of a control process of transferring data received from the external apparatus from the interface circuit to the accelerator or the central arithmetic processing apparatus and a control process of transferring data to be transmitted to the external apparatus from the accelerator or the central arithmetic processing apparatus to the interface circuit; a data processing control unit configured to perform control for causing the first data processing of the accelerator and the second data processing of the data processing execution unit to be executed on the data received from the external apparatus or the data to be transmitted to the external apparatus; and a processing result copy unit configured to perform at least one of control for outputting a first processing result which is a processing result of the first data processing to the central arithmetic processing apparatus and designating the first processing result as a processing target of the second data processing and control for outputting a second processing result which is a processing result of the second data processing to the accelerator and designating the second processing result as a processing target of the first data processing.

According to another aspect of the present invention, a central arithmetic processing apparatus is provided including: a storage unit configured to store data received from an external apparatus or data to be transmitted to the external apparatus; a data processing execution unit configured to perform data processing using the data stored in the storage unit and store a processing result in the storage unit; an external transfer control unit configured to perform at least one of a control process of transferring the data received from the external apparatus from an interface circuit to an accelerator or the storage unit and a control process of transferring the data to be transmitted to the external apparatus from the accelerator or the storage unit to the interface circuit; a data processing control unit configured to perform control for causing data processing of the accelerator and the data processing of the data processing execution unit to be executed on the data received from the external apparatus or the data to be transmitted to the external apparatus; and a processing result copy unit configured to perform at least one of control for transferring a first processing result which is a processing result of the data processing of the accelerator to the storage unit and designating the first processing result as a processing target of the data processing of the data processing execution unit and control for transferring a second processing result which is a processing result of the data processing of the data processing execution unit from the storage unit to the accelerator and designating the second processing result as a processing target of the data processing of the accelerator.

According to another aspect of the present invention, a data processing method to be executed by a data processing system is provided, the data processing method including: a first data processing step in which an accelerator performs first data processing; a second data processing step in which a central arithmetic processing apparatus performs second data processing; an external transfer step in which the central arithmetic processing apparatus performs at least one of a control process of transferring data received from the external apparatus from the interface circuit to the accelerator or the central arithmetic processing apparatus and a control process of transferring data to be transmitted to the external apparatus from the accelerator or the central arithmetic processing apparatus to the interface circuit; a data processing control step in which the central arithmetic processing apparatus performs control for causing the first data processing of the first data processing step and the second data processing of the second data processing step to be executed on the data received from the external apparatus or the data to be transmitted to the external apparatus; and a processing result copy step in which the central arithmetic processing apparatus performs at least one of control for outputting a first processing result which is a processing result of the first data processing to the central arithmetic processing apparatus and designating the first processing result as a processing target of the second data processing and control for outputting a second processing result which is a processing result of the second data processing to the accelerator and designating the second processing result as a processing target of the first data processing.

Advantageous Effects of Invention

According to the present invention, the central arithmetic processing apparatus and the accelerator can cooperatively perform data processing.

DESCRIPTION OF EMBODIMENTS

Hereinafter, embodiments of the present invention will be described in detail with reference to the drawings.

In a data processing system of the present embodiment, an interface (I/F) board activates an interrupt handler of a central processing unit (CPU) (a central arithmetic processing apparatus) at periodic timings. The interrupt handler specifies a transfer destination memory on a graphics processing unit (GPU) when data is transferred from the CPU or the I/F board to the GPU and a transfer source memory on the GPU when data is transferred from the GPU to the I/F board or the CPU. Furthermore, the interrupt handler performs mathematical function activation of the CPU, kernel activation of the GPU, a memory copy between the CPU and the GPU, and the issuance of a direct memory access (DMA) transfer command between the GPU and the I/F board or between I/F boards.

According to the data processing system of the present embodiment, continuous signal transfer to the outside is also possible while a cooperative process between the CPU and the GPU is performed. Consequently, by applying the data processing system of the present embodiment to a communication apparatus, it is possible to implement a high-speed communication process including both an available parallel processing function and an unavailable parallel processing function and implement software for all the functions. Hereinafter, a detailed embodiment will be described using an example of a case in which the data processing system is a terminal station apparatus of an access system.

First Embodiment

Figure 1:
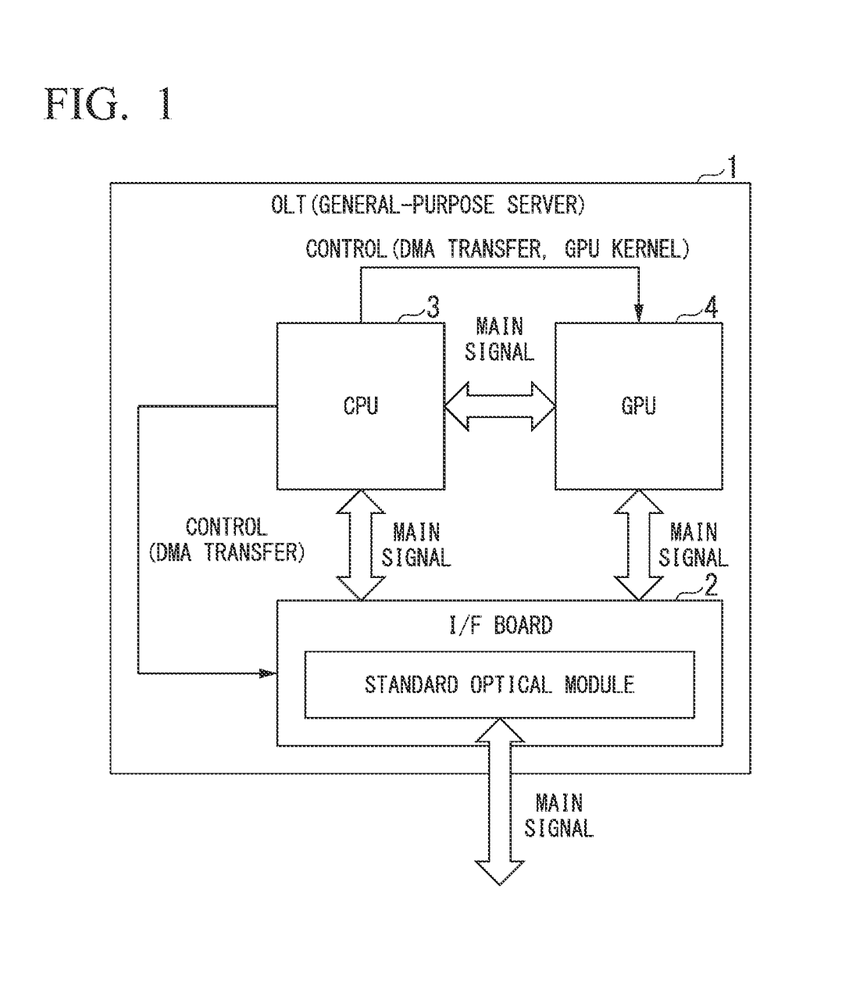
FIG. 1 is a diagram showing a configuration of an OLT according to a first embodiment of the present invention.

FIG. 1 is a diagram showing a configuration of an optical line terminal (OLT) 1 according to the present embodiment. The OLT 1 is an example of a data processing system. The OLT 1 is implemented using, for example, a general-purpose server. According to the configuration shown in FIG. 1, the OLT 1 performs a CPU-GPU cooperative operation. The OLT 1 includes an I/F board 2, a CPU 3, and a GPU 4.

The I/F board 2 is an interface circuit implemented by, for example, a field-programmable gate array (FPGA), a dedicated board, or the like. The I/F board 2 inputs and outputs signals between an external apparatus and a processor. For example, external apparatuses are an optical network unit (ONU) and an upper level apparatus and processors are the CPU 3 and the GPU 4. The I/F board 2 periodically activates an interrupt handler of the CPU 3. The I/F board 2 performs DMA transfer in accordance with control from the interrupt handler of the CPU 3. That is, the I/F board 2 transfers a main signal included in a signal received from the external apparatus to the CPU 3 and the GPU 4. Also, the I/F board 2 acquires a main signal addressed to the external apparatus from a memory retained by the CPU 3 or a memory retained by the GPU 4 and outputs the acquired main signal to the external apparatus. The I/F board 2 includes a standard optical module that converts an electrical signal and an optical signal. The standard optical module converts an optical signal received from the ONU via an optical transmission line into an electrical signal. Also, the standard optical module converts an electrical signal addressed to the ONU into an optical signal and outputs the optical signal to the optical transmission line.

The CPU 3 activates an interrupt handler according to an interrupt from the I/F board 2. The interrupt handler executes control for performing DMA transfer between the CPU 3 and the GPU 4 and the I/F board 2 with respect to the I/F board 2. Also, the interrupt handler executes control for performing DMA transfer between the CPU 3 and the GPU 4 and control for activating the kernel of the GPU 4 with respect to the GPU 4. Thereby, the main signal is transmitted and received between the CPU 3 and the GPU 4 as well as between the I/F board 2 and the processor. Also, the CPU 3 performs sequential processing within data processing included in a physical coding sublayer (PCS) with respect to the main signal received by the I/F board 2 or transmitted from the I/F board 2.

The GPU 4 is an example of an accelerator. The GPU 4 executes the kernel in accordance with control from the CPU 3. The GPU 4 performs data processing which is available parallel processing within the data processing included in the PCS with respect to the main signal transferred from the I/P board 2 or the CPU 3 through the kernel.

Figure 2:
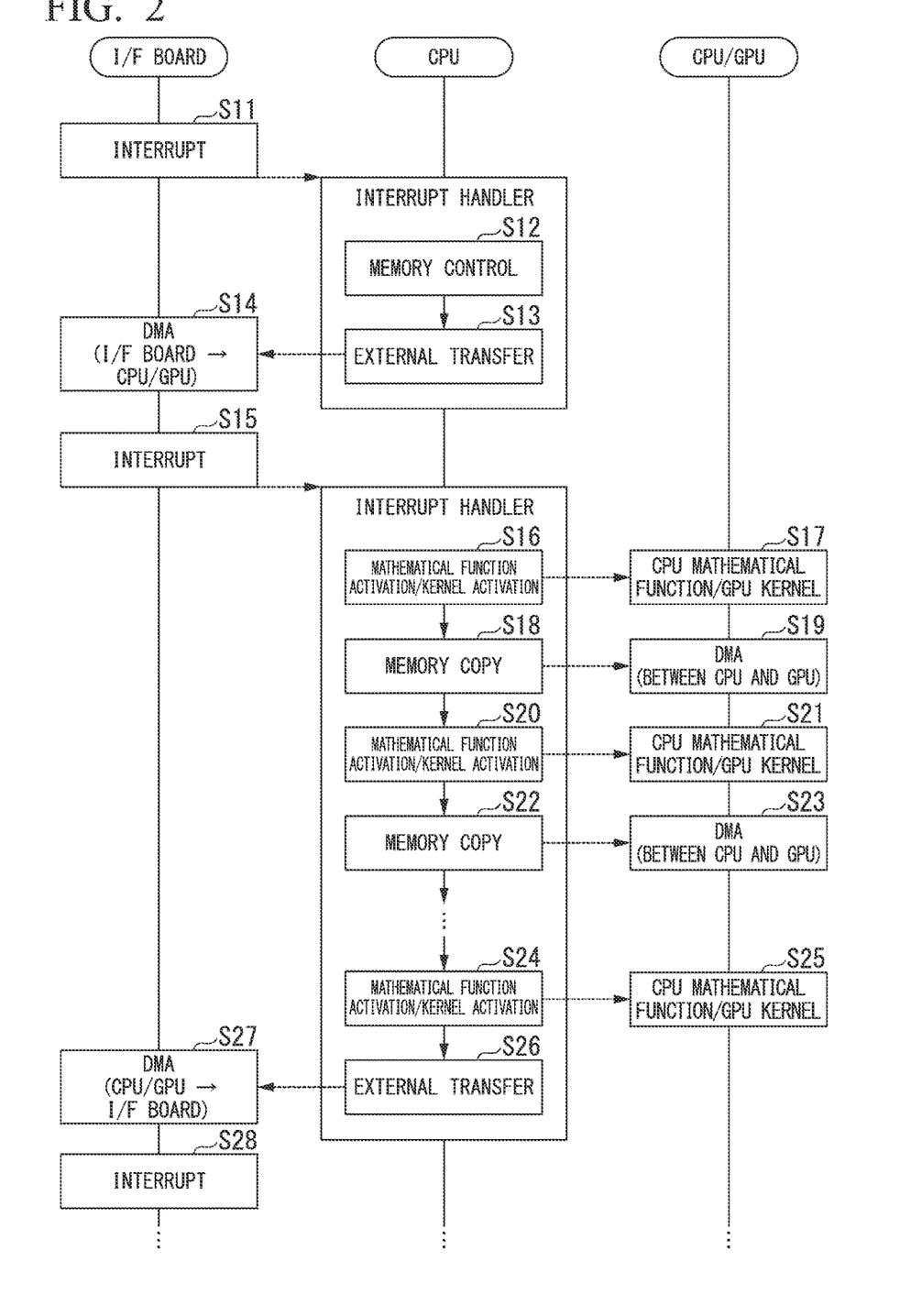
FIG. 2 is a flowchart showing a process of the OLT according to the first embodiment.

FIG. 2 is a flowchart showing processing in the OLT 1. Functions of the I/F board 2, the CPU 3 and the GPU 4 of the OLT 1 will be described with reference to the FIG. 2. First, the I/F board 2 transmits an interrupt signal to the CPU 3 when preparations for inputting a signal from outside or outputting a signal to outside are completed (step S11).

When the CPU 3 receives the interrupt signal from the VP board 2, the CPU 3 activates the interrupt handler. The interrupt handler first determines a memory area of the CPU 3 for storing data for which the mathematical function of the CPU 3 is an operation target and a memory area of the GPU 4 for storing data for which the kernel of the GPU 4 is an operation target by performing memory control (step S12). Also, a memory area for storing input data and a memory area for storing data to be output may be different. Subsequently, the interrupt handler notifies the VP board 2 of one or both of the memory address of the CPU 3 and the memory address of the GPU 4 and further instructs the I/F board 2 to perform external transfer (step S13). The I/F board 2 transfers data of the main signal to one or both of the memory of the CPU 3 and the memory of the GPU 4 at the address of the notification that has been provided (step S14).

In the next interrupt cycle, the I/F board 2 transmits the interrupt signal to the CPU 3 (step S15). When the CPU 3 receives the interrupt signal from the I/F board 2, the CPU 3 activates the interrupt handler. The interrupt handler performs mathematical function activation or kernel activation with respect to the memory area of the memory address determined in step S12 (step S16). Also, the interrupt handler performs the mathematical function activation when the data has been transferred to the memory of the CPU 3 and performs the kernel activation when the data has been transferred to the memory of the GPU 4 in step S14. Also, when the kernel of the GPU 4 is activated, the interrupt handler notifies the GPU 4 of the memory address of the GPU 4 determined in step S12, processing to be executed in parallel by the GPU 4, and the like.

When the mathematical function activation has been performed in step S16, the CPU 3 performs a mathematical function operation on a main signal stored in the memory area of the CPU 3 indicated by the memory address and writes an operation result of the mathematical function operation to the memory area of the CPU 3. On the other hand, when the kernel activation has been performed in step S16, the GPU 4 activates the kernel and executes processing of an instruction from the interrupt handler of the CPU 3 in parallel with respect to the main signal stored in the memory area of the GPU 4. The GPU 4 writes a result of executing processing in parallel to the memory area of the GPU 4 (step S17).

Subsequently, the interrupt handler issues an instruction for a memory copy between the CPU 3 and the GPU 4 (step S18). The CPU 3 and the GPU 4 perform DMA transfer in accordance with the instruction of the interrupt handler (step S19). That is, when it is detected that the mathematical function operation activated in step S16 has been completed, the interrupt handler copies content of the memory area of the CPU 3 in which a result of executing the mathematical function operation in step S17 is stored to a memory area of the GPU 4 determined in step S12. Alternatively, when it is detected that the parallel processing of the GPU 4 activated in step S16 has been completed, the interrupt handler copies content of the memory area of the GPU 4 in which the result of executing the parallel processing in the GPU 4 in step S17 is stored to the memory area of the CPU 3 indicated by the memory address determined in step S12. Also, the interrupt handler may detect the end of parallel processing in the GPU 4 by receiving a notification from the GPU 4 or may detect the end of parallel processing by detecting an end flag written to the memory of the GPU 4 when the parallel processing ends.

Subsequently, the CPU 3 and the GPU 4 iterate the processing of steps S16 to S19 as necessary (steps S20 to S23). That is, the interrupt handler arbitrarily iterates the mathematical function activation and the kernel activation, iterates the operations in each of the CPU 3 and the GPU 4, and copies data of operation results between the CPU 3 and the GPU 4.

Finally, the OLT 1 performs processing similar to that of steps S16 and S17 (steps S24 and S25), then the interrupt handler starts the DMA of the I/F board 2 by transmitting a DMA activation command to the I/F board 2 (step S26). At this time, the interrupt handler notifies the I/F board 2 of a memory address of the CPU 3 where a result of executing a mathematical function operation in step S25 is stored or a memory address of the GPU 4 where a result of executing parallel processing in step S25 is stored as a data transfer source. The I/F board 2 copies data from the data transfer source (step S27). The I/F board 2 transmits the data transferred from the CPU 3 or the GPU 4 to the ONU or the upper level apparatus. This data is a main signal. The interrupt in the I/F board 2 is continuously iterated (step S28).

As described above, according to the present embodiment, DMA transfer (a main signal) between the CPU 3 and the GPU 4 is enabled by incorporating the execution of DMA between the CPU 3 and the GPU 4 according to a memory copy command of the CPU 3 into a signal transfer flow. Also, when the instruction of the external transfer is issued, the CPU 3 can select whether the transfer is transfer between the CPU 3 and the I/F board 2 or transfer between the GPU 4 and the I/F board 2 and whether the transfer is transfer to the I/F board 2 or transfer from the I/F board 2. Consequently, both the CPU 3 and the GPU 4 can perform DMA transfer (transfer of the main signal) in both directions to and from the I/F board 2. Furthermore, it is possible to allocate any processing to the CPU and the GPU in any order by iterating the memory copy and the mathematical function/kernel activation any number of times.

Second Embodiment

In the present embodiment, an example of a detailed configuration of the OLT 1 will be described using as an example of signal processing in a direction (downlink) from the processor to the I/F board.

Figure 3:
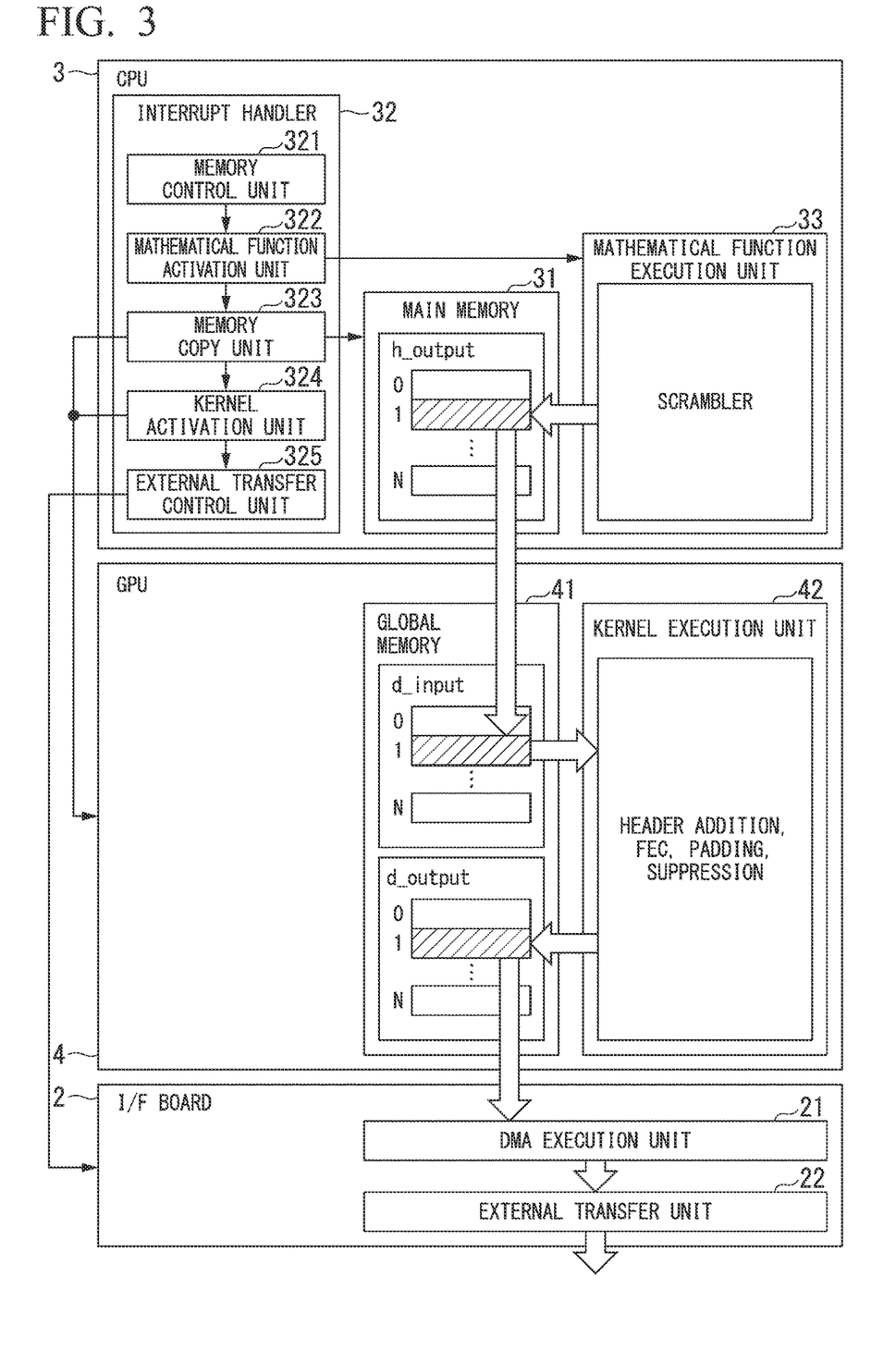
FIG. 3 is a diagram showing a configuration related to processing of a downlink signal of an OLT according to a second embodiment.

FIG. 3 is a diagram showing a configuration related to downlink signal processing in the OLT 1. An OLT of a passive optical network (PON) standard such as 10 Gigabit Ethernet (registered trademark) passive optical network (10G-EPON), a next-generation passive optical network 2 (NG-PON2), or a 10-Gigabit-capable-symmetric passive optical network (XGS-PON) has a configuration similar to that of shown in FIG. 3.

The CPU 3 has a main memory 31, an interrupt handler 32, and a mathematical function execution unit 33. The main memory 31 is an example of a storage unit that stores a main signal received from an external apparatus or a main signal to be transmitted to the external apparatus. The main memory 31 has an input/output memory area h_output. The interrupt handler 32 includes a memory control unit 321, a mathematical function activation unit 322, a memory copy unit 323, a kernel activation unit 324, and an external transfer control unit 325. The memory control unit 321 performs memory control for determining a memory address of the CPU 3 where a mathematical function is an operation target and a memory address of the GPU 4 where parallel processing activated by the kernel of the GPU 4 is an operation target. The mathematical function activation unit 322 instructs the mathematical function execution unit 33 to execute the mathematical function. The memory copy unit 323 copies data between the I/F board 2 or the GPU 4 and the main memory 31. The kernel activation unit 324 instructs the GPU 4 to activate the kernel. The external transfer control unit 325 issues an instruction of the DMA transfer between the I/F board 2 and the CPU 3 or the GPU 4.

The GPU 4 includes a global memory 41 and a kernel execution unit 42. The global memory 41 has an input memory area d_input and an output memory area d_output. The kernel execution unit 42 activates the kernel and executes parallel processing.

The I/F board 2 includes a DMA execution unit 21 and an external transfer unit 22. The DMA execution unit 21 receives an instruction from the CPU 3 and copies data of a main signal from the CPU 3 or the GPU 4. The external transfer unit 22 converts the main signal copied by the DMA execution unit 21 into an optical signal and transmits the optical signal to the ONU.

Next, processing of a downlink signal in the OLT 1 will be described.

In the present embodiment, an input of the main signal is retained in the memory area h_output within the main memory 31 of the CPU 3. The memory area h_output has N buffers. A value of an index specifies one of these N buffers. Each time the main signal is input, the CPU 3 executes a scrambler having a sequential function on the CPU 3 while changing the index indicating an address of the buffer of the memory area h_output.

Specifically, when the I/F board 2 activates the interrupt handler 32 of the CPU 3, the memory control unit 321 determines an address of the memory area h_output used in the main memory 31 and addresses of the memory area d_input and the memory area d_output used in the global memory 41. The external transfer control unit 325 notifies the I/F board 2 of the index indicating the address of the memory area h_output and further instructs the I/F board 2 to transfer the main signal. The external transfer unit 22 of the I/F board 2 transfers the main signal to the buffer of the memory area h_output indicated by the index.

When the CPU activates the interrupt handler 32 in the next cycle after the main signal is transferred to the main memory 31, the mathematical function activation unit 322 notifies the mathematical function execution unit 33 of the index of the memory area h_output, and further instructs the mathematical function execution unit 33 to activate the scrambler. The scrambler performs a process of changing a bit position of a data string. The mathematical function execution unit 33 uses the main signal read from the buffer of the memory area h_output indicated by the index as input data to execute a mathematical function having the function of the scrambler, and writes a result of executing the mathematical function to the buffer.

Each of the memory area d_input and the memory area d_output of the global memory 41 also have N buffers. A value of an index specifies one of these N buffers. Also, the number of buffers provided in the memory area h_output, the number of buffers provided in the memory area d_input, and the number of buffers provided in the memory area d_output may be different. The memory control unit 321 determines the index indicating the input/output memory address of the GPU 4 as shown in the following equation. The GPU 4 transfers data while sequentially changing the index of each of the memory area d_input and the memory area d_output in the global memory 41.

$$\text{index}=(\text{index}+1) \bmod N$$

Here, N is the number of buffers of the GPU 4 and mod indicates a remainder operation. Subsequently, the memory copy unit 323 performs a memory copy from the CPU 3 to the GPU 4 with respect to a memory address determined by the memory control unit 321. Further, the kernel activation unit 324 specifies the address of the transferred memory with respect to the GPU 4 and activates the kernel. The GPU 4 activates the kernel, executes header addition, forward error correction (FEC), padding, and suppression, which are available parallel processing functions, in parallel and stores calculation results in the output memory area d_output.

Specifically, after the scrambler processing is completed, the memory copy unit 323 outputs the index of the main memory 31 and the index of the memory area d_input of the global memory 41 to the GPU 4 and further instructs the GPU 4 to copy the memory. The GPU 4 copies the main signal from the buffer of the memory area h_output of the main memory 31 to the buffer of the memory area d_input of the global memory 41 on the basis of the indexes of the notification that has been provided.

Subsequently, the interrupt handler 32 notifies the GPU 4 of the indexes of the memory area d_input and the memory area d_output of the global memory 41, and further instructs the GPU 4 to execute header addition, FEC coding, padding, and suppression in parallel. The header addition is a process of adding a header to the main signal. The padding is a process of padding data of a predetermined pattern to an empty area of a field used for transmission. The suppression is a process of deleting extra data added to a predetermined position, such as 0 added to the beginning of data. The kernel execution unit 42 of the GPU 4 executes processing of the header addition, the FEC coding, the padding, and the suppression in parallel using the data stored in the buffer of the memory area d_input indicated by the index of the notification that has been provided. The kernel execution unit 42 writes each processing result of parallel processing to the buffer of the memory area d_output indicated by the index of the notification that has been provided.

The external transfer control unit 325 of the CPU 3 notifies the I/F board 2 of the index indicating the buffer of the memory area d_output of the global memory 41, and further transmits an external transfer command to the I/F board 2. The DMA execution unit 21 of the I/F board 2 starts DMA and transfers the main signal from the buffer of the memory area d_output indicated by the index of the notification that has been provided. The external transfer unit 22 converts the main signal read from the GPU 4 into an optical signal and outputs the optical signal to an external apparatus such as an ONU.

According to the above-described embodiment, control for enabling continuous signal transfer is performed by an architecture in which cooperative processing is possible in the CPU and the GPU. Consequently, it is possible to implement a high-speed communication process including both an available parallel processing function and an unavailable parallel processing function such as a coding process of the PCS and expand a software area of the access system.

According to the above-described embodiment, the data processing system includes an interface circuit configured to communicate with an external apparatus; an accelerator configured to perform first data processing; and a central arithmetic processing apparatus configured to control the accelerator and the interface circuit. For example, the data processing system is the OLT 1, the accelerator is the GPU 4, the central arithmetic processing apparatus is the CPU 3. The central arithmetic processing apparatus includes a data processing execution unit, an external transfer control unit, a data processing control unit, and a processing result copy unit. For example, the data processing execution unit is the mathematical function execution unit 33, the external transfer unit is the external transfer control unit 325, the data processing control unit is the mathematical function activation unit 322 and the kernel activation unit 324, and the processing result copy unit is the memory copy unit 323. The data processing execution unit performs second data processing. The external transfer control unit performs at least one of a control process of transferring data received from the external apparatus from the interface circuit to the accelerator or the central arithmetic processing apparatus and a control process of transferring data to be transmitted to the external apparatus from the accelerator or the central arithmetic processing apparatus to the interface circuit. The data processing control unit performs control for causing the first data processing of the accelerator and the second data processing of the data processing execution unit to be executed on the data received from the external apparatus or the data to be transmitted to the external apparatus. The processing result copy unit performs at least one of control for outputting a first processing result which is a processing result of the first data processing to a storage unit of the central arithmetic processing apparatus and designating the output first processing result as a processing target of the second data processing and control for outputting a second processing result which is a processing result of the second data processing from the storage unit to the accelerator and designating the output second processing result as a processing target of the first data processing.

For example, the first data processing performed by the accelerator is parallel processing and the second data processing performed by the central processing unit is sequential processing. When the data processing system is a terminal station apparatus in the PON system, the first data processing is parallel processing of header addition, forward error correction coding, padding, and suppression, and the second data processing includes a process including scrambling processing.

Although embodiments of the present invention have been described above in detail with reference to the drawings, specific configurations are not limited to the embodiments and other designs and the like may be made without departing from the scope of the present invention.

INDUSTRIAL APPLICABILITY

The present invention can be used in an apparatus including a central arithmetic processing apparatus and an accelerator.

REFERENCE SIGNS LIST

1 OLT
2 I/F board
3 CPU
4 GPU
21 DMA execution unit
22 External transfer unit
31 Main memory
32 Interrupt handler
33 Mathematical function execution unit
41 Global memory
42 Kernel execution unit
321 Memory control unit
322 Mathematical function activation unit
323 Memory copy unit
324 Kernel activation unit
325 External transfer control unit

The invention claimed is:

1. A data processing system comprising:
an interface circuit configured to communicate with an external apparatus;
an accelerator configured to perform first data processing; and
a central arithmetic processing apparatus configured to control the accelerator and the interface circuit,
wherein the central arithmetic processing apparatus includes:
  a data processor configured to perform second data processing;
  an external transfer controller configured to perform at least one of a control process of transferring data received from the external apparatus from the interface circuit to the accelerator or the central arithmetic processing apparatus and a control process of transferring data to be transmitted to the external apparatus from the accelerator or the central arithmetic processing apparatus to the interface circuit;
  a data processing controller configured to perform control for causing the first data processing of the accelerator and the second data processing of the data processor to be executed on the data received from the external apparatus or the data to be transmitted to the external apparatus; and
  a processing result copy processor configured to perform at least one of control of the accelerator for outputting a first processing result which is a processing result of the first data processing to the central arithmetic processing apparatus and designating the first processing result as a processing target of the second data processing and control for outputting a second processing result which is a processing result of the second data processing to the accelerator and designating the second processing result as a processing target of the first data processing.

2. The data processing system according to claim 1,
wherein the first data processing is parallel processing, and
wherein the second data processing is sequential processing.

3. The data processing system according to claim 1,
wherein the data processing system is a terminal station apparatus,
wherein the first data processing is parallel processing of header addition, forward error correction coding, padding, and suppression, and
wherein the second data processing is scrambling processing.

4. A central arithmetic processing apparatus comprising:
a storage configured to store data received from an external apparatus or data to be transmitted to the external apparatus;
a data processor configured to perform data processing using the data stored in the storage and store a processing result in the storage;
an external transfer controller configured to perform at least one of a control process of transferring the data received from the external apparatus from an interface circuit to an accelerator or the storage and a control process of transferring the data to be transmitted to the external apparatus from the accelerator or the storage to the interface circuit;
a data processing controller configured to perform control for causing data processing of the accelerator and the data processing of the data processor to be executed on the data received from the external apparatus or the data to be transmitted to the external apparatus; and
a processing result copy processor configured to perform at least one of control for transferring a first processing result which is a processing result of the data processing of the accelerator to the storage and designating the first processing result as a processing target of the data processing of the data processor and control for transferring a second processing result which is a processing result of the data processing of the data processor from the storage to the accelerator and designating the second processing result as a processing target of the data processing of the accelerator.

5. A data processing method to be executed by a data processing system, the data processing method comprising:
a first data processing step in which an accelerator performs first data processing;
a second data processing step in which a central arithmetic processing apparatus performs second data processing;
an external transfer step in which the central arithmetic processing apparatus performs at least one of a control process of transferring data received from the external apparatus from the interface circuit to the accelerator or the central arithmetic processing apparatus and a control process of transferring data to be transmitted to the external apparatus from the accelerator or the central arithmetic processing apparatus to the interface circuit;
a data processing control step in which the central arithmetic processing apparatus performs control for causing the first data processing of the first data processing step and the second data processing of the second data processing step to be executed on the data received from the external apparatus or the data to be transmitted to the external apparatus; and a processing result copy step in which the central arithmetic processing apparatus performs at least one of control of the accelerator for outputting a first processing result which is a processing result of the first data processing to the central arithmetic processing apparatus and designating the first processing result as a processing target of the second data processing and control for outputting a second processing result which is a processing result of the second data processing to the accelerator and designating the second processing result as a processing target of the first data processing.

* * * * *